(No Model.) 2 Sheets—Sheet 1.

O. OHLSSON.
CENTRIFUGAL BUTTER EXTRACTOR.

No. 487,055. Patented Nov. 29, 1892.

Witnesses
Oscar A. Michel
Wm. Breitenbach

Inventor:
Olof Ohlsson,
By Draket Co., Atty's.

(No Model.) 2 Sheets—Sheet 2.
O. OHLSSON.
CENTRIFUGAL BUTTER EXTRACTOR.

No. 487,055. Patented Nov. 29, 1892.

Witnesses  Inventor:
Oscar A. Michel.  Olof Ohlsson,
Wm Breitenbach.  By Drake & Co, Atty's.

UNITED STATES PATENT OFFICE.

OLAF OHLSSON, OF NEWARK, NEW JERSEY.

CENTRIFUGAL BUTTER-EXTRACTOR.

SPECIFICATION forming part of Letters Patent No. 487,055, dated November 29, 1892.

Application filed April 14, 1892. Serial No. 429,111. (No model.)

*To all whom it may concern:*

Be it known that I, OLAF OHLSSON, a citizen of Sweden, residing at Newark, in the county of Essex and State of New Jersey, have invented certain new and useful Improvements in Butter-Extractors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to dispense with the operation of mechanically working the cream to break up the butter globules, to avoid the danger of overworking the butter and thus impairing the quality and reducing the value of the same, to increase the capacity of the machines of this class, or to more rapidly make butter from a given amount of milk, and to secure other advantages and results, some of which will be hereinafter referred to in connection with the descriptions of the working parts.

The invention consists in the process of extracting butter and in the improved butter extractor or separator having the arrangements and combinations of parts, all substantially as will be hereinafter set forth, and finally embodied in the clauses of the claim.

Figure 1:
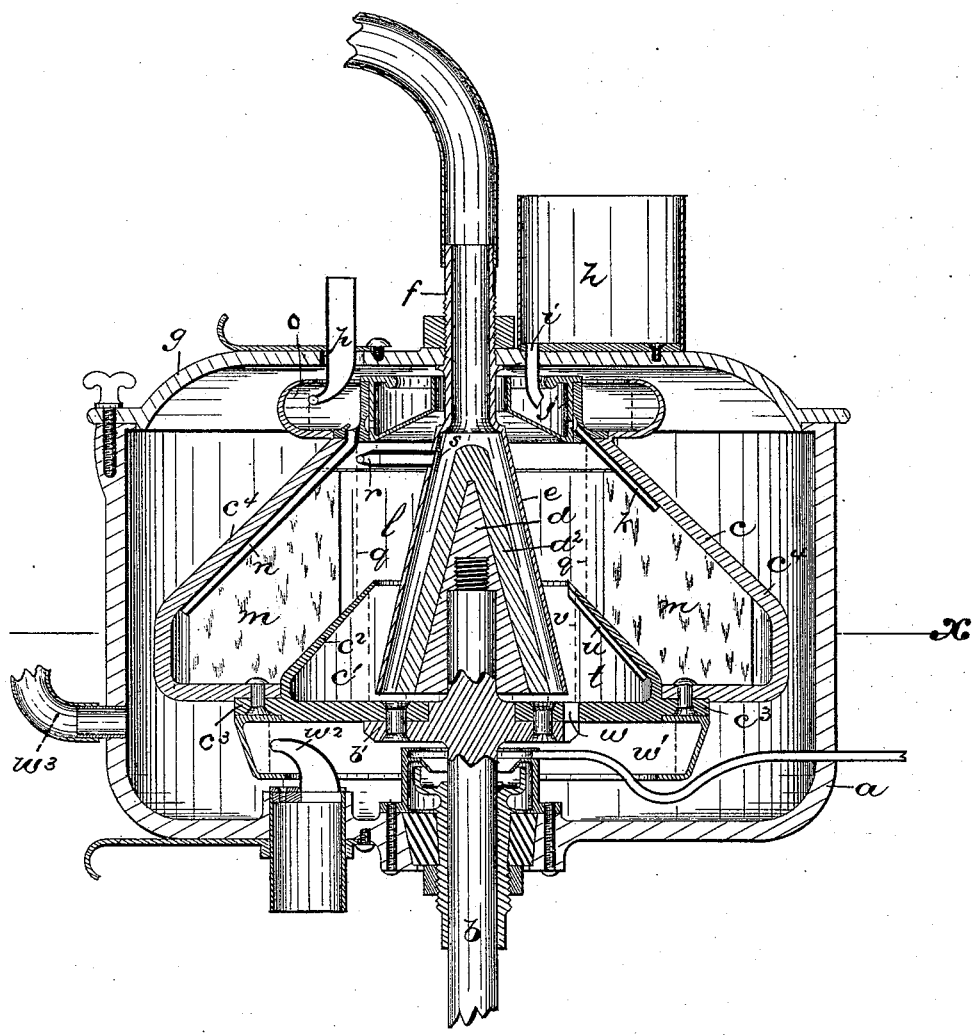
Figure 2:
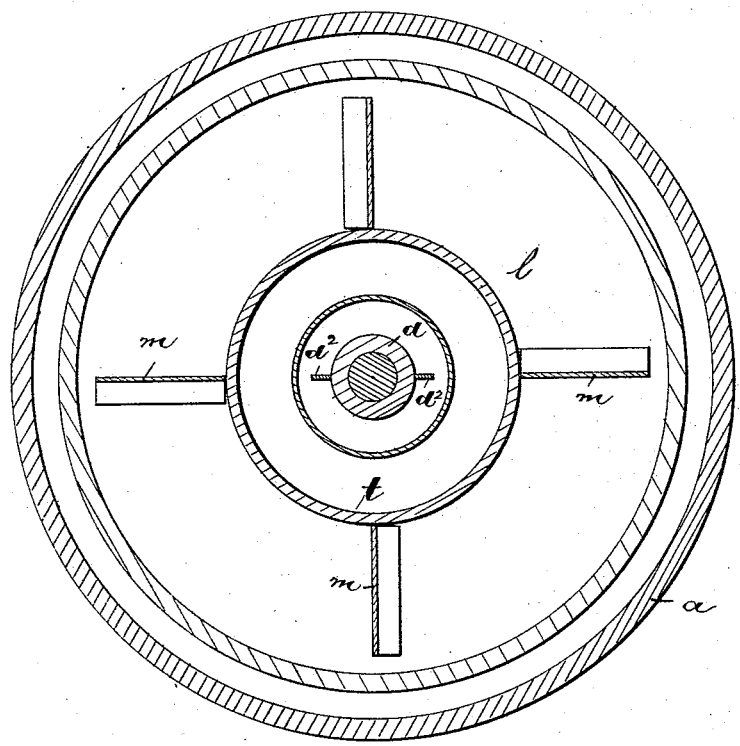

Referring to the accompanying drawings, in which like letters indicate corresponding parts in each of the views, Figure 1 is a central vertical section of the improved machine, and Fig. 2 is a horizontal section of the same, taken at line $x$.

In the drawings, $a$ indicates a stationary cast-metal tank suitably supported, but the supports not being shown. Through the bottom of said tank a vertical shaft $b$ extends into said tank, the latter providing bearings for the same of any ordinary construction. Upon said shaft $b$ is arranged a bowl $c$, which is of steel forgings to withstand centrifugal pressure brought thereon, and the same is made in sections riveted together.

The preferred method of construction is shown and is as follows: Upon the shaft $b$ is formed a flange $b'$, upon which is riveted the bottom section $c'$ of the bowl. This said section is provided on the upper side thereof with an inwardly-inclined flange $c^2$, forming an inner bowl of small size. Outside of said inner bowl the bottom section $c'$ is extended, as at $c^3$, and provides a bearing on which the outer section $c^4$ is riveted. This said section is also inwardly inclined to complete the bowl. Thus two bowls are formed in connection with the rotary shaft, an outer bowl of comparatively-large size and a smaller inner bowl the upper edges of which are below those of the outer bowl. Both bowls have inwardly-inclined walls and have central openings at the tops. The marginal edge of the inner bowl projects to a point nearer to the center of the outer bowl than the vertical lines $q$ of the cream-walls formed in said outer bowl, for a purpose hereinafter disclosed. The shaft $b$ extends through the bottom section $c'$ and provides a bearing or support for an inner cone $d$, the smaller end of which extends upward toward the mouth of the bowl $c$, while the base lies closely adjacent to the bottom $c'$. Said cone is provided with fans $d^2$, adapted to give rotary motion to the air around said cone and to force the same outward and, because of the shape of the chamber around said cone, downward. Around said cone, but lying a little from the walls thereof, is a stationary hollow cone or cap $e$, which is fixed to an air-duct $f$, extending up through top or cover $g$ of the tank to a suitable refrigerator or cooling-chamber.

Suitable means are provided for conveying the milk from the reservoir $h$ to the tank and for separating the cream from the skim-milk and the butter from the buttermilk. These devices are of any usual construction; but mechanical means for churning the cream and breaking the butter globules are dispensed with.

The preferred arrangements for conducting the fluids and separating the butter therefrom are as follows: From the tank $h$ the milk flows through the short pipe $i$ to the feeding-rim $j$, where the milk is first brought under the influence of centrifugal force and is caused to pass outward through the pipe $k$ into the larger bowl-chamber $l$, having fans or wings $m$ to impart rapid rotary movement to the body of milk lying in the bowl-chamber $l$. Here the skim-milk is separated from the cream and the former, being the heavier, passes toward the periphery of the bowl and finally passes out through the tube $n$ to another rim-chamber $o$, where it is caught by the pipe $p$ and led away from the machine. The lighter cream collects toward the center of the chamber $l$ and forms a cream-wall at $q$, where it is caught by the pipe $r$ and led within the cone $e$ in comparatively-small quantities. A screen $s$ covers the opening from said pipe and prevents the cream from being thrown against the fans $d^2$. Said screen tends to direct said cream so that it flows down the inside wall of the hollow cone in a thin film. The rotary fan produces a suction, draws the cold air through the duct $f$ from the refrigerator, and directs it against the film of cream, rapidly cooling the same, and this action tends to harden the butter and separate it from the buttermilk without mechanical churning. In this cooled condition the cream flows into the smaller chamber $t$ of the bowl $c^2$, and again coming under the action of centrifugal force the buttermilk separates from the butter. The buttermilk being the heavier is forced outward through the tube $n$ into the chamber $l$ once more, where any butter it may still contain is separated and mixes with the cream. The butter in the chamber $t$ is forced from the butter-wall $v$ through the opening $w$ into the butter-chamber $w'$, where it is caught by the knife $w^2$ and led to any suitable receptacle. By the construction described the milk is first brought under the influence of centrifugal force at a high temperature of, say, 80° Fahrenheit, and at this temperature the cream is rapidly separated from the skim-milk. The rapid change of temperature from 80° to, say, 55° is effective in separating or in bringing the cream in condition to be separated by the subsequent centrifugal action. By this action all danger of over working or churning is avoided. The cool air follows the butter into the chambers $t$ $w'$ and passes out through the duct $w^3$ back to the refrigerator. Inasmuch as but only a part of the milk is cooled instead of the whole, as in prior processes, the cost of cooling is much reduced.

Having thus described the invention, what I claim as new is—

1. The process of extracting butter from milk herein described, which consists in separating the cream from the milk by rapidly rotating the same, then directing the cream over a suitable surface in a thin film in a separate chamber from the skim-milk and subjecting it to the action of a rapidly-rotating air-current, and thus imparting rotary movement to the cream and buttery particles therein, substantially as set forth.

2. In combination with the tank $a$, a shaft $b$, having a rotary bowl thereon, a cone $d$, having a wing or fan $d^2$, a hollow cone forming a fan-chamber with the cone $d$, a duct $f$ for cold air, and a passage or opening $s$, providing a way for the cream into said fan-chamber, substantially as set forth.

3. In a centrifugal butter-extractor, the combination, with a larger rotary bowl, of a smaller rotary bowl having its upper edge project within the line of the cream-wall of the larger bowl, a duct for conducting the cream into the smaller bowl, a duct for conveying the buttermilk back into the larger bowl, and a duct communicating with the last-mentioned duct for transmitting cold air thereto, and a passage for transferring the butter to the butter-chamber, substantially as set forth.

4. In combination, in a butter-extractor, a rotary shaft $b$, having outer and inner bowls thereon, the chamber in the inner bowl having communication with the outer bowl and a cream-cooling chamber disposed centrally with relation to the inner bowl and having communication with inner bowl to allow the cream to be conveyed or conducted to said inner bowl, and means, substantially as described, for cooling the cream, all substantially as and for the purposes set forth.

5. The process herein described of extracting butter, which consists in transferring the cream from the cream-separating chamber to the butter-separating chamber through a cooling-chamber, in which it is subjected to rapidly-rotating cold air prior to subjecting it to the butter-separating operation, substantially as set forth.

6. The process herein described, consisting in subjecting the cream to the action of rapidly-rotating cold air while said cream is spread in a thin film, then separating the butter therefrom, and then conducting the buttermilk to a cream-chamber and subjecting said buttermilk to further rotary motion and extracting the butter more perfectly therefrom, substantially as set forth.

7. In combination with a rotary bowl for separating cream from milk, a pipe or conduit $r$ for directing the cream to a cooling-chamber, said cooling-chamber and a conduit for cold air leading thereto, and a centrifugal fan for giving rotary movement to the cooled air and throwing it outward against wall and against the cream gravitating thereon, and a centrifugal butter-separating chamber communicating with said cooling-chamber, adapted to receive the cooled cream from said cooling-chamber and subject the same to centrifugal force, substantially as set forth.

8. In a butter extracting or separating machine, the combination, with the rotary bowl, of cream-separating means at the outer part of said bowl and at the center of said bowl, a cooling chamber or passage communicating with means for furnishing cold air and cream, and a centrifugal chamber for separating the butter from the cooled cream, substantially as set forth.

9. In a butter extracting or separating machine, the combination, with a rotary bowl having wings at the outer part forming cream-separating chambers and means for supplying the same with milk and for directing the cream and skim-milk from said chambers, of a hollow cone and an inner cone having a cooling-passage between, and a centrifugal chamber receiving the cooled cream from said passage and separating the butter therefrom.

In testimony that I claim the foregoing I have hereunto set my hand this 2d day of April, 1892.

OLAF OHLSSON.

Witnesses:
CHARLES H. PELL,
OSCAR A. MICHEL.